(12) United States Patent
Tevs et al.

(10) Patent No.: US 10,371,558 B2
(45) Date of Patent: Aug. 6, 2019

(54) SYSTEM AND METHOD FOR MEASURING A BIN LEVEL VIA AN ELECTROMAGNETIC SIGNAL

(71) Applicant: Deere & Company, Moline, IL (US)

(72) Inventors: Nikolai R. Tevs, Daytona Beach Shores, FL (US); Terry L. Snipes, East Moline, IL (US); Elijah B. Garner, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 195 days.

(21) Appl. No.: 15/411,191

(22) Filed: Jan. 20, 2017

(65) Prior Publication Data

US 2018/0058900 A1    Mar. 1, 2018

Related U.S. Application Data (60) Provisional application No. 62/382,115, filed on Aug. 31, 2016.

(51) Int. Cl.
| | | |
|---|---|---|
| G01F 23/284 | (2006.01) | |
| G01F 22/00 | (2006.01) | |
| G01F 23/00 | (2006.01) | |
| A01C 15/00 | (2006.01) | |
| A01D 41/127 | (2006.01) | |
| G01S 13/00 | (2006.01) | |

(52) U.S. Cl.
CPC ........ *G01F 23/2845* (2013.01); *A01C 15/006* (2013.01); *G01F 22/00* (2013.01); *G01F 23/0061* (2013.01); *G01F 23/284* (2013.01); *A01D 41/1275* (2013.01)

(58) Field of Classification Search
CPC .............................. G01S 13/325; G01S 13/32
See application file for complete search history.

(56) References Cited

U.S. PATENT DOCUMENTS 4,234,882 A * 11/1980 Thompson .............. G01S 13/32
342/124
4,311,957 A    1/1982 Hewitt et al.
(Continued)

FOREIGN PATENT DOCUMENTS

| EP | 843959 A1 | 5/1998 |
|---|---|---|
| EP | 940656 A1 | 9/1999 |

(Continued)

OTHER PUBLICATIONS

Yeow, Y.K. et al. "Application of Microwave Moisture Sensor for Determination of Oil Palm Fruit Ripeness." Measurement Science Review, vol. 10, No. 1, 2010. Feb. 3, 2010.

(Continued)

*Primary Examiner* — Bernarr E Gregory (57) ABSTRACT

A data processor retrieves or accesses a reference bin level versus reference phase for a determined seed type. A measurement device, receiver, or phase measurement module measures an observed phase of a primary received signal. The data processor is adapted to determine an estimated bin level of seeds, where the estimated bin level is established as the reference bin level that corresponds to a respective reference phase that is closest in value to the observed phase.

27 Claims, 9 Drawing Sheets

(56) References Cited

U.S. PATENT DOCUMENTS

| | | | |
|---|---|---|---|
| 4,443,792 A * | 4/1984 | Pidgeon | G01F 23/284 342/124 |
| 4,782,282 A | 11/1988 | Bachman | |
| 4,806,847 A | 2/1989 | Atherton et al. | |
| 5,057,848 A | 10/1991 | Rankin et al. | |
| 5,233,352 A * | 8/1993 | Cournane | G01S 13/325 342/124 |
| 5,529,537 A * | 6/1996 | Johnson | A01D 41/1275 460/119 |
| 5,609,059 A * | 3/1997 | McEwan | G01F 23/284 342/124 |
| 5,770,865 A * | 6/1998 | Steffen | A01D 41/1275 250/223 B |
| 5,957,773 A * | 9/1999 | Olmsted | A01D 41/1275 460/149 |
| 6,986,294 B2 * | 1/2006 | Fromme | G01F 23/284 73/865.8 |
| 7,068,050 B2 | 6/2006 | Steele et al. | |
| 8,410,793 B2 | 4/2013 | Armbruster et al. | |
| 9,924,636 B2 | 3/2018 | Lisouski et al. | |
| 9,949,435 B2 * | 4/2018 | Banks, Jr. | A01D 41/1275 |
| 10,188,037 B2 | 1/2019 | Bruns et al. | |
| 2004/0031335 A1 * | 2/2004 | Fromme | G01F 23/284 73/865 |
| 2004/0183718 A1 | 9/2004 | Hagg | |
| 2005/0026662 A1 | 2/2005 | Fechner et al. | |
| 2006/0240884 A1 * | 10/2006 | Klimmer | A01D 41/1275 460/119 |
| 2007/0106172 A1 | 5/2007 | Abreu | |
| 2008/0079628 A1 * | 4/2008 | Wilkie | G01F 23/284 342/124 |
| 2009/0139436 A1 | 6/2009 | Memory | |
| 2009/0325658 A1 * | 12/2009 | Phelan | A01D 41/1275 460/6 |
| 2011/0248725 A1 | 10/2011 | Mukherjee | |
| 2012/0253611 A1 * | 10/2012 | Zielke | A01D 41/1275 701/50 |
| 2014/0326066 A1 | 11/2014 | Mears | |
| 2014/0331631 A1 | 11/2014 | Sauder et al. | |
| 2015/0293029 A1 | 10/2015 | Acheson et al. | |
| 2016/0330907 A1 | 11/2016 | Anderson et al. | |
| 2017/0065464 A1 | 3/2017 | Heil et al. | |
| 2018/0059034 A1 | 3/2018 | Advani et al. | |

FOREIGN PATENT DOCUMENTS

| | | | |
|---|---|---|---|
| EP | 1714542 A1 * | 10/2006 | A01D 41/1275 |
| JP | S6333296 A | 2/1988 | |
| WO | 9849529 A1 | 11/1998 | |

OTHER PUBLICATIONS

Milligan, Thomas A. "6-3 Rectangular Microstrip Patch Antenna." Modem Antenna Design, published Jan. 1, 2005, pp. 299-300, John Wiley & Sons, Hoboken, New Jersey.

European Search Report issued in counterpart application No. 17188890.2, dated Mar. 12, 2018 (12 pages).

* cited by examiner

SYSTEM AND METHOD FOR MEASURING A BIN LEVEL VIA AN ELECTROMAGNETIC SIGNAL

RELATED APPLICATION

This document (including the drawings) claims priority and the benefit of the filing date based on U.S. provisional application No. 62/382,115, filed Aug. 31, 2016 under 35 U.S.C. §119 (e), where the provisional application is hereby incorporated by reference herein.

FIELD

This disclosure relates to a system and method for measuring a bin level via an electromagnetic signal.

BACKGROUND

In certain prior art, optical and ultrasonic sensors can be used to estimate the level of material inside of a container. However, the performance of optical and ultrasonic sensors is degraded by dust, dirt and airborne contaminants that may lead to erroneous estimated levels of material in a container. For example, if the container for a row of a planter is fed with seed material, erroneous estimated levels may result in overflowing of the container or the absence of planted seeds in a row, segment or area of a field. Thus, there is a need for a sensor and method for measuring a bin level via and electromagnetic signal.

SUMMARY

In accordance with one embodiment, a system and method for measuring one or more seed levels in a bin comprises determining a seed type. A data processor retrieves or accesses a reference bin level (e.g., bin volume level) versus reference phase for the determined seed type. A measurement device, receiver, or phase measurement module measures an observed phase of a primary received signal. The data processor is adapted to determine an estimated bin level (e.g., bin volume level) of seeds, where the estimated bin level is established as the reference bin level that corresponds to a respective reference phase that is closest in value to the observed phase. For example, the estimated bin level can be displayed to an operator or used to control the supply of seed to the bin.

BRIEF DESCRIPTION OF THE DRAWINGS

FIG. 3B.

Like reference numbers in any two drawings in this document indicate like features or steps.

DETAILED DESCRIPTION

Figure 1:
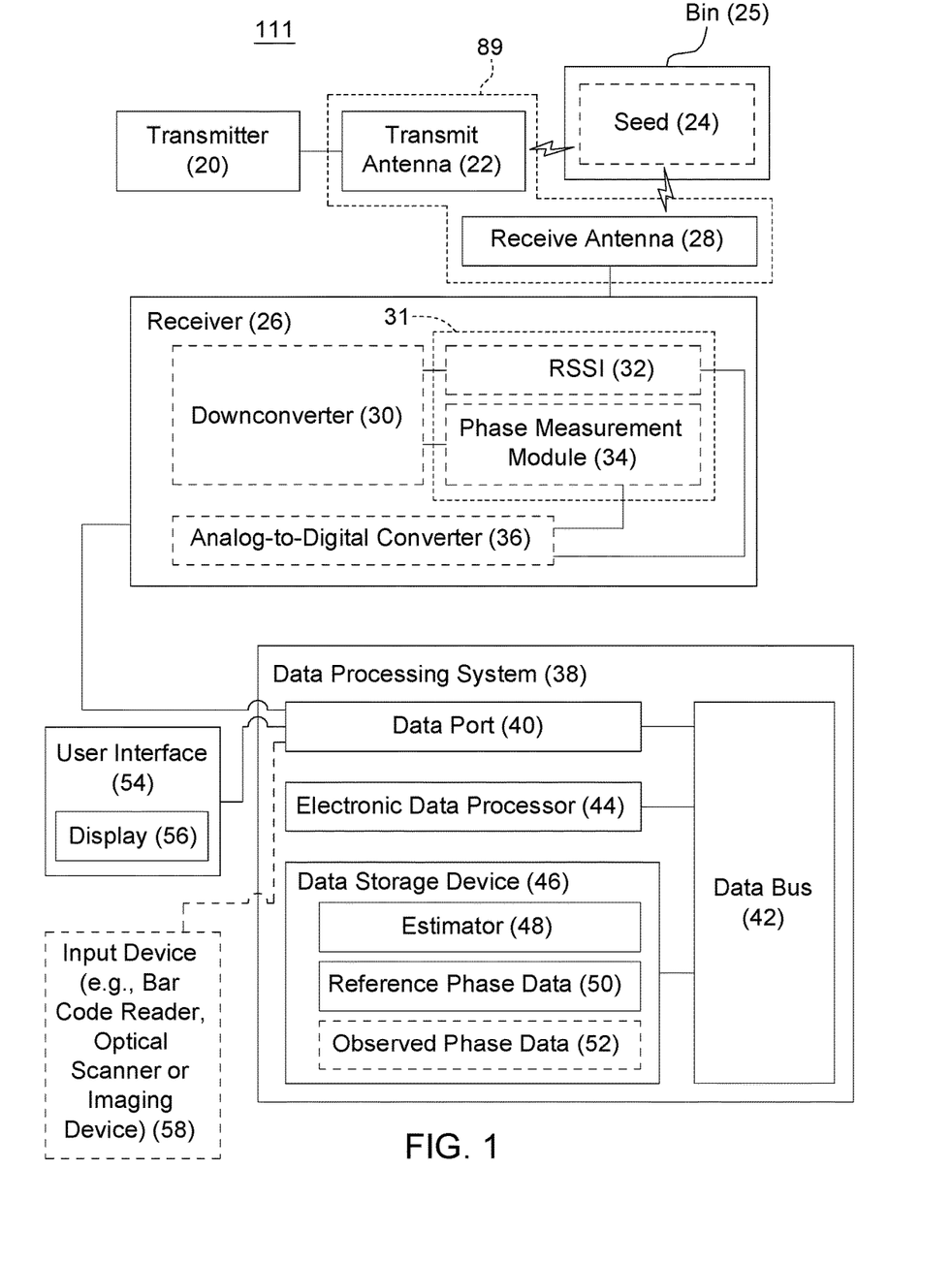
FIG. 1 is a block diagram of one embodiment of a measurement device or system for measuring a bin level via an electromagnetic signal.

In accordance with one embodiment, an electronic data processor 44 retrieves or accesses a stored reference bin level (e.g., bin volume level of bin 25) versus reference phase for the determined seed type in the data storage device 46. A measurement device, receiver 26, or phase measurement module 34 measures an observed phase (e.g., observed primary phase) of a primary received signal. The data processor 44 is adapted to determine an estimated bin level (e.g., bin volume level of bin 25) of seeds 24, where the estimated bin level is established as the reference bin level that corresponds to the respective reference phase that is closest in value to the observed phase (e.g., observed primary phase). For example, the estimated bin level can be displayed to an operator or a bin status message can be provided to a controller that is responsible for replenishing the bin with seeds 24 or maintaining a target bin level of seeds in the bin. In accordance with one embodiment, a method for measuring one or more seed levels in a bin 25 comprises determining a seed type.

In accordance with one embodiment, FIG. 1 discloses a measurement device 111 that is capable of providing a precise estimate of a bin level of a bin 25, hopper or other container that holds seeds 24, coated seeds, or other plant materials. The measurement device 111 comprises a transmitter 20 for providing a transmitted signal at a frequency (e.g., primary frequency).

A bin 25, hopper or container composed of a dielectric material, such as plastic, polymer, a fiber reinforced plastic, a fiber reinforced polymer or a composite material composed of resin and a matrix of filler. In practice, the transmit antenna 22 and the receive antenna 28 can be in microstrip configuration with ground plane; the antennas (22, 28) on the dielectric substrate can be covered with dielectric spacer or a protective dielectric layer to protect the antennas (22, 28) from shorting out to ground or other components.

The bin 25 can hold seeds 24 or similar plant material. The transmit antenna 22 and the receive antenna 28 are mounted on, secured or disposed in close proximity to the bin 25, and any seeds within the bin 25.

The transmitted signal (e.g., primary signal) can be attenuated or changed in phase (e.g., primary phase) by one or more of the following: (1) the bin 25, hopper or container or one or more walls of the bin 25; (2) the seed 24 or plant material in the bin 25, hopper or container, (3) moisture content in the seed 24 or plant material of the bin 25, or (4)

oil content in the seed 24 or plant material of the bin 25. Once the transmitted signal is received by the receive antenna 28 or the receiver 26, it may be referred to as a received signal (e.g., primary received signal). The receiver 26 provides a received signal (e.g., derived from the transmitted signal) from the receive antenna 28 via a strip line, microstrip, coaxial cable or other transmission line 72. The receive antenna 28 has a transmission line 72 that is electrically connected to, or electromagnetically coupled to, the receive antenna 28.

In one embodiment, the transmit antenna 22 has a radiating element, such as a first conductive trace 60, and the receive antenna has a receiving element, such as second conductive trace 64. Although the radiating element and the receiving element may have various size and shape configurations, in one embodiment the radiating element and the receiving element each comprise a metallic rectangle (e.g., square) with a surface area or size commensurate with the frequency of the transmitted signal and received signal. In certain embodiments, the transmitter 20 may feed the transmit antenna 22 with a circularly polarized transmitted signal (e.g., primary transmitted signal).

In an alternate embodiment, the transmit antenna 22 and the receive antenna 28 may be replaced by horn antennae with horizontal polarization, vertical polarization, circular polarization, or other polarizations.

A receiver 26 is capable of receiving the transmitted signal or received signal from the receive antenna 28. Once received by the receive antenna 28 or receiver 26, or both, the transmitted signal may be referred to as a received signal (e.g., primary received signal) in this document.

In one embodiment, the receiver 26 comprises a downconverter 30, a receiver signal strength indicator (RSSI) module 32, a phase measurement module 34 and an analog-to-digital converter 36. The above modules or components of the receiver 26 are indicated in dashed lines in FIG. 1 because they are optional and may be replaced by other configurations. A module may refer to software, electronics hardware, or both.

In one configuration, the receiver 26 comprises a microwave or radio frequency front end (e.g., low noise amplifier) for receiving the transmitted signal from the receive antenna 28. The front end is coupled to a downconverter 30, such as one or more mixer stages to downconvert the received signal to a baseband signal or intermediate frequency signal for processing. The downconverter 30 is coupled to a receive signal strength indicator (RSSI) module 32 and a phase measurement module 34. The RSSI module 32 may be associated with a discriminator (e.g., for a frequency modulation or phase modulated received signal). The phase measurement module 34 measures the phase (e.g., primary phase) of the received signal. For example, in one embodiment, the phase measurement module 34 may use a local signal generator and one or more correlators to detect or measure a phase of the received signal. An analog-to-digital converter 36 converts analog data measurements of one or more of the following to digital measurements or representations: signal strength, attenuation, phase shift or phase change between the transmitted signal and the received signal, reference phase change between the transmitted signal and the received signal for an empty, and reference phase changes between the transmitted signal and the received signal for various corresponding reference levels of the bin 25.

The receiver 26 can provide or transmit the digital measurements or representations to the data processing system 38 via one or more data ports 40 of the data processing system 38. The data ports 40 refer to input/output data ports that may comprise transceivers and buffer memory, or other electronic hardware.

In one embodiment, an electronic data processor 44 comprises a microprocessor, a microcontroller, a digital signal processor, a programmable logic array, a field programmable gate array, an applicable specific integrated circuit, a logic circuit, a Boolean logic circuit, an arithmetic logic unit, or the like. An electronic data processor 44 is adapted to measure or process measurements of one or more of the following observed signal parameters to estimate an estimated bin level of one or more bins: (1) an observed attenuation of the transmitted signal (or received signal) between the transmit antenna 22 and the receive antenna 28, (2) observed phase change (e.g., primary phase change, secondary phase change or both) of the transmitted signal (or received signal) between the transmit antenna 22 and receive antenna 28. The electronic data processor 44 can measure the observed signal parameters (e.g., observed attenuation) between the transmit antenna 22 and the receive antenna 28 in various modes. During a calibration mode or reference mode, the electronic data processor 44 measures one or more of the following reference or baseline signal parameters: (1) a reference attenuation between the transmit antenna 22 and the receive antenna 28 when no seed or plant material is present in the bin (25, 125, 225) and (2) reference phase change (e.g., primary phase change, secondary phase change, or both) between the transmit antenna 22 and the receive antenna 28 when no seed or plant material is present in the bin (25, 125, 225).

Alternately, during a calibration mode or reference mode, the electronic data processor 44 measures one or more of the following reference or baseline signal parameters: (1) a reference attenuation between the transmit antenna 22 and the receive antenna 28 when a known level of seed or plant material is present in the bin (25, 125, 225) and (2) reference phase change between the transmit antenna 22 and the receive antenna 28 when a known level of seed or plant material is present in the bin (25, 125, 225).

Further, during a calibration mode or reference mode, the electronic data processor 44 measures one or more of the following reference or baseline signal parameters: (1) a reference attenuation between the transmit antenna 22 and the receive antenna 28 when a known level of seed of a known seed type is present in the bin (25, 125, 225) and (2) reference phase change between the transmit antenna 22 and the receive antenna 28 when a known level of seed of known seed type is present in the bin (25, 125, 225).

During an operational mode, the data processor 44 measures one or more of the following observed signal parameters: (1) attenuation of the transmitted signal (or received signal) between the transmit antenna 22 and the receive antenna 28 when seed or plant is present in the bin (25, 125, 225), and (2) phase change (e.g., primary phase change, secondary phase change, or both) of the transmitted signal (or received signal) between the transmit antenna 22 and the receive antenna 28 when seed or plant material is present in the bin (25, 125, 225).

In one configuration, the seed 24 or plant material comprises grain, maize, corn, oil seed, kernel, seed, soybeans, wheat, barley, oats, cotton, fiber, or other plant material. In some embodiments, the seed 24 or plant material is composed of following main chemical constituent groups: (1) moisture (water), (2) oil, (3) protein, (4) starch/sugars, and (5) cellulose. For corn, the grain contains sugar, starch, protein and oil. Among the above constituents, the measurement device can use at least the oil content as the basis for the measurement of the signal parameters.

In one configuration, the data storage device 46 comprises or stores an estimator 48, reference phase data 50 and observed phase data 52, such one or more of the following: observed primary phase data, observed secondary phase data, primary reference phase data, and secondary reference phase data. For example, the reference phase data 50 is collected in a reference mode or calibration mode when no seed or plant material 24 is present in the respective bin 25 associated the corresponding transmit antenna 22 and the receive antenna 28, where phase shift is less than when seed or plant material 24 is present in the respective bin 25 associated with the corresponding transmit antenna 22 and the receive antenna 28. The data storage device 46 may also store reference phase data that is collected in a reference mode or calibration mode when a known level of seed or plant material 24 is present in the respective bin 25 associated with the corresponding transmit antenna 22 and the receive antenna 28. In contrast, the observed phase data 52 and observed phase data 52 is collected when seed or plant material is present (e.g., at an unknown level) in the bin 25 associated with transmit antenna 22 and the receive antenna 28.

In another configuration, the data storage device 46 further stores reference attenuation data and observed attenuation data. For example, the reference attenuation data is collected in a reference mode or calibration mode when no seed or plant material 24 is present in the respective bin 25 associated with the transmit antenna 22 and the receive antenna 28, where attenuation is less than when seed or plant material 24 is present in the respective bin 25 associated with the transmit antenna 22 and the receive antenna 28. The data storage device 46 may also store reference attenuation data that is collected in a reference mode or calibration mode when a known level of seed or plant material 24 is present in the respective bin 25 associated with the corresponding transmit antenna 22 and the receive antenna 28. In contrast, the observed attenuation data and observed attenuation data is collected when seed or plant material is present (e.g., at an unknown level) in the respective bin 25 associated with the transmit antenna 22 and the receive antenna 28.

Figure 8:
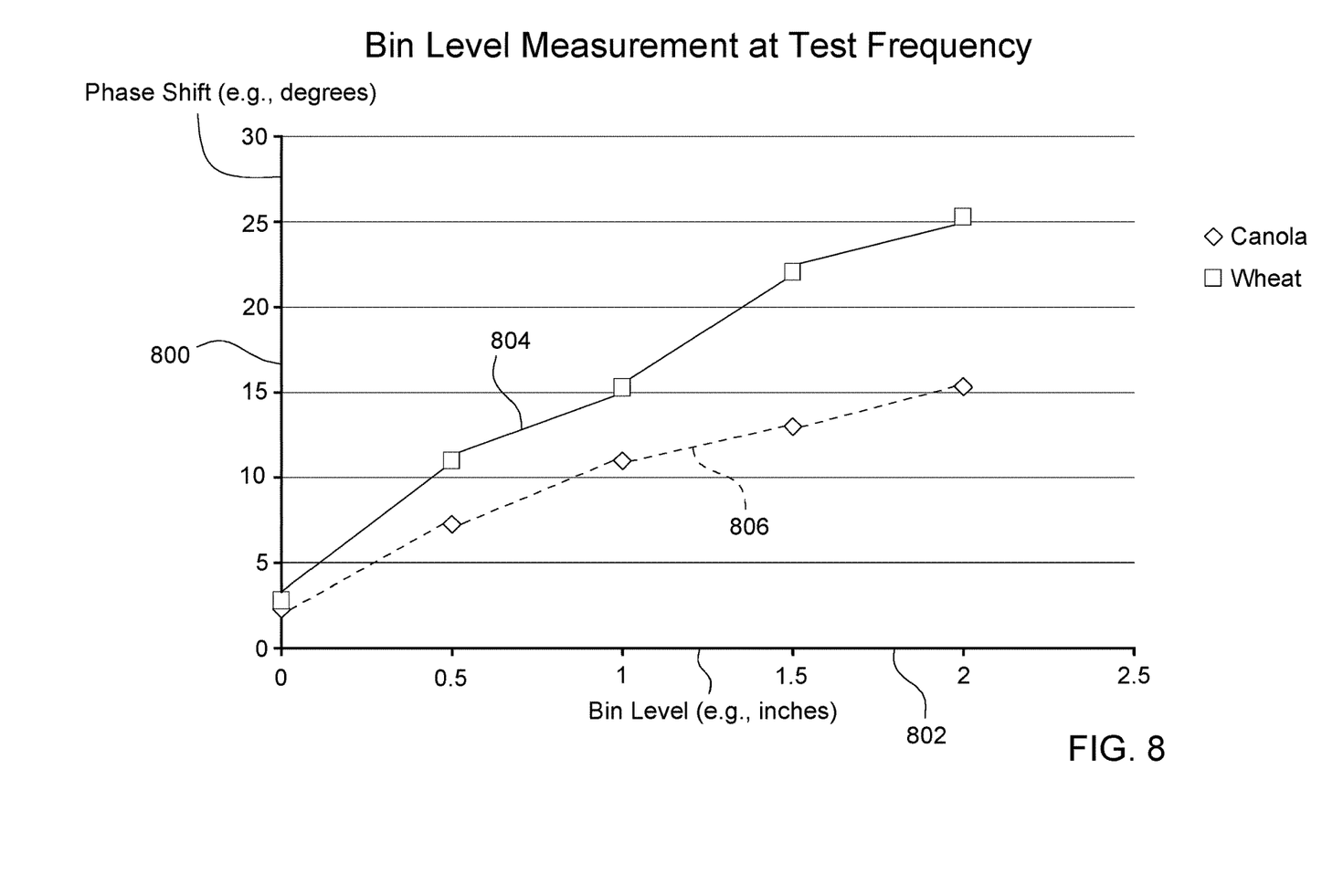
FIG. 8 is an illustrative chart of bin level versus phase shift (or change in phase of a received signal) for two different seed types.

In one embodiment, the attenuation of the transmitted signal (or received signal) is predominantly because of dielectric absorption losses of the seed or plant material 24, or the oil content in the seed or plant material 24. During the calibration mode when no seed or plant material 24 is present in the bin 25, the observed phase shift of the signal between the transmit antenna 22 and the receiving signal is minimal. During an operational mode when seeds 24 or plant material are present in the bin 25, the phase shift in the (transmitted or) received signal tends to increase with increasing level of seeds 24 or plant material in the bin 25. For example, as illustrated in FIG. 8, the graph shows bin level along the horizontal axis and phase shift along the vertical axis. The bin level may be expressed a vertical measurement (e.g., height) of the level of seed or plant material in the bin 25 from a bottom of the bin 25 to the current level (e.g. height) of seed 24 or plant material. Alternately, the bin level may be expressed in terms of volume, fraction or a percentage of the entire or full bin capacity of the bin 25.

During the operational mode, the phase shift or phase change between the transmitted signal by the transmitter 20 and the received signal by the receiver 26 can depend upon the following factors: (1) spatial separation or spatial difference between the transmit antenna 22 and the receive antenna 28, (2) the frequency or wavelength of the transmitted signal, and (3) any phase change or phase shift in the transmitted signal (or received signal) induced by the oil content or other properties of the seed or plant material 24.

In one embodiment, a data storage device 46 is coupled to the electronic data processor 44 via a data bus 42. In one example, the data storage device 46 comprises electronic memory, nonvolatile random access electronic memory, a magnetic storage device, an optical storage device, or the like. The data storage device 46 stores a measurement of a reference signal parameter, such as a reference signal strength, an attenuation threshold or reference attenuation, a reference phase change, or other reference data on signal parameters, when no seed or plant material 24 is present in the bin 25 or in the signal path (e.g., fringing signal path) between the transmit antenna 22 and receive antenna 28.

In one configuration, data storage device 46 may store a determined seed type that is within the bin, where the determined seed type is entered, inputted or selected by an operator via a user interface 54 or input device 58 (e.g., bar code reader, optical scanner, or imaging device).

The electronic data processor 44 is arranged to determine a difference or differences (e.g., an attenuation difference, a phase change difference or both) between the observed signal parameter of the reference signal parameter. For example, the electronic data processor 44 is arranged to determine an attenuation difference between the observed attenuation the reference attenuation. Similarly, the electronic data processor 44 can determine the phase difference between the observed phase change and the reference phase change, where the reference phase change can include reference measurements with seed present in the bin 25 and reference measurements with seed absent in the bin 25. An estimator 48 uses the difference or differences to determine: (1) whether seed or plant material 24 is present during a sampling interval, and (2) the bin 25 level, amount, volume, mass; the fraction or percentage of full level, volume or mass capacity of the seed or plant material 24 that is present in the bin 25, such as the bin for a row unit of a planter during a sampling interval.

Figure 2:
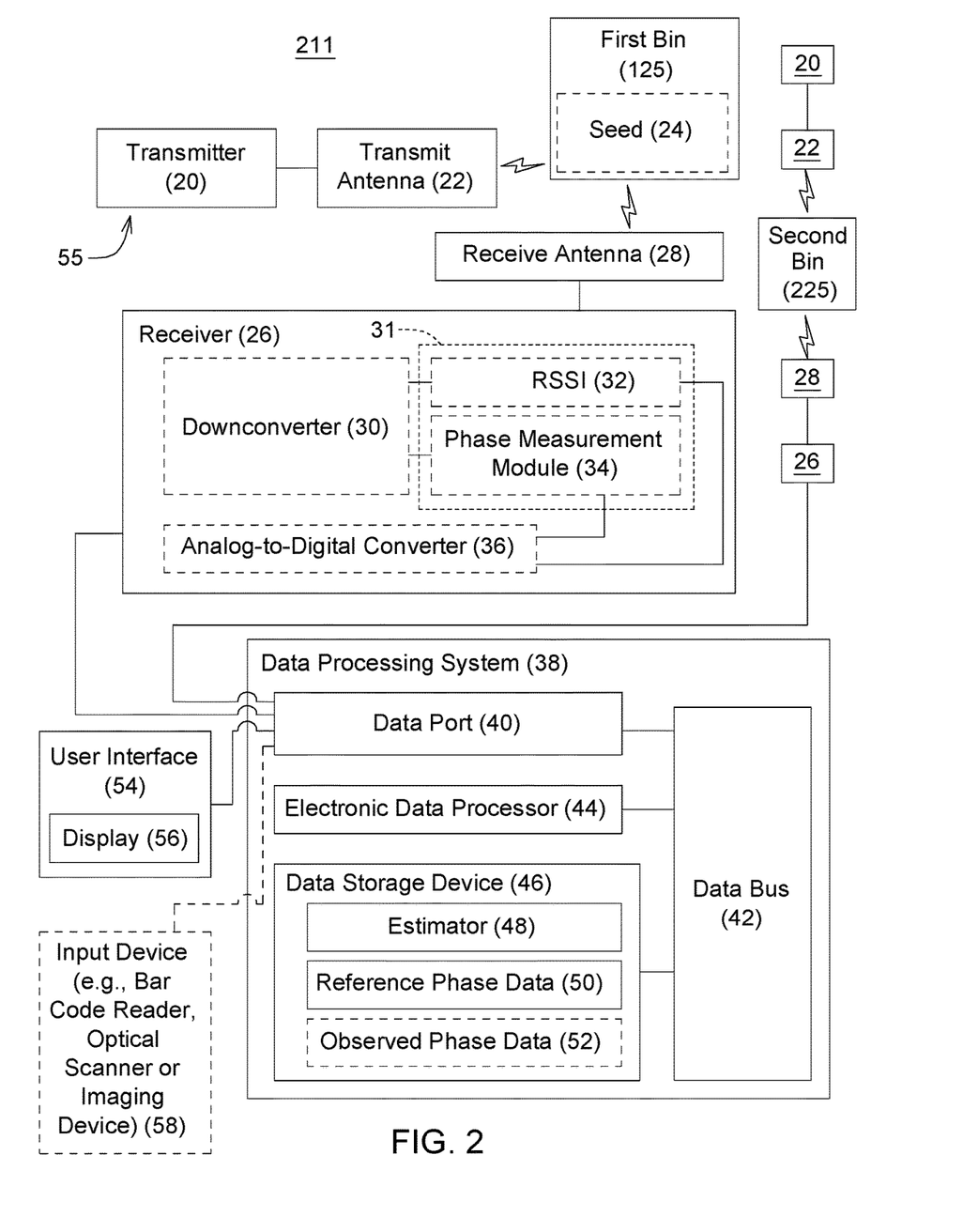
FIG. 2 is a block diagram of another embodiment of a plurality of measurement devices associated with bins or hoppers of a planter.

In one embodiment, the measurement device (111, 211) operates within a frequency range of approximately 100 MHz to approximately 6 GHz, such as 275 MHz to approximately 5.5 GHz, to measure the signal parameters (e.g., absorption, attenuation, phase change or other signal characteristics) of seed or plant material 24 or oil content of the seed or plant material 24 (e.g., grain, kernel or seeds 24) with respect to the above frequency range within the radio frequency spectrum, the microwave spectrum, or both.

In an alternate embodiment, the measurement device (111, 211) of FIG. 1, FIG. 2 may further comprise a location-determining receiver, such as satellite navigation receiver with differential correction for determining position (e.g., three dimensional coordinates) of the planter or planting machine, or movement data (e.g., velocity, acceleration, heading, yaw tilt and roll) during one or more sampling intervals. For example, the satellite navigation receiver may comprise a Global Positioning System (GPS) receiver that is coupled to the data port 40.

In one embodiment, a user interface 54 may be coupled to the data processing system 38 or the data port 40, where the user interface 54 comprises a keyboard, a keypad, a display 56, a touch screen display, a pointing device (e.g., an electronic mouse), or another device that supports input or output of data for the data processing system 38.

In one configuration, the measurement device or system comprises an optional input device 58 for inputting or determining a seed type in a bin 25, wherein the user interface 54 comprises a bar code scanner, an optical scanner, or an imaging device, that a supports scanning or imaging a seed label indicative of seed type. The optional input device 58 is indicated in dashed lines because it is optional and can be replaced by other input.

The measurement device 211 of FIG. 2 is similar to the measurement device 111 of FIG. 1, except the measurement device 211 of FIG. 2 further comprises multiple row units of a planter, a planting implement or other equipment. Each row unit has a corresponding bin, where the first row unit has a corresponding first bin 125 and where the second row unit has a corresponding second bin 225. Each row unit may be associated with a different transmitter 20, transmit antenna 22, receive antenna 28 and receiver 26 that communicate with the data processing system 38. Like reference numbers in FIG. 1 and FIG. 2 indicate like elements.

As the planter traverses a field, each row unit plants seeds or plant material for a row or portion of a row in the field. The data processing system 38 can support display, monitoring or control of the first bin level of the first bin 125, the second bin level of the second bin 225, or both. For example, the first bin level and the second bin level may be displayed on the display 56 as independent levels (e.g., bin heights or volumes) to manage replenishment or refilling of seeds in the bins (15, 225) separately, or together.

Figure 3A:
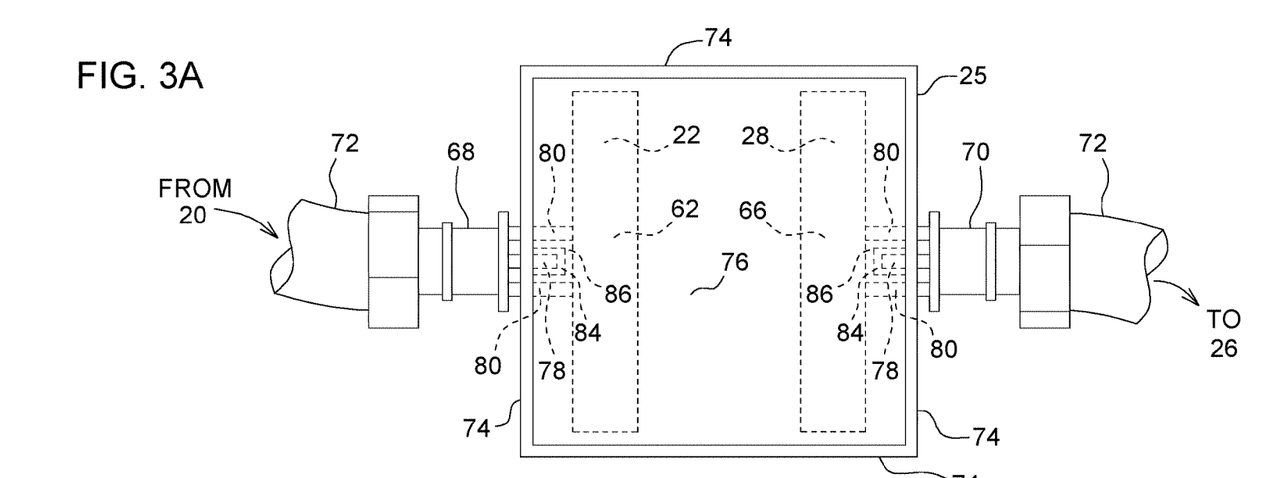
FIG. 3A is a plan view of one embodiment of a bin with ground terminals of transmission lines connected to corresponding conductive strips, illustrated in dashed lines, on a lower side of a substrate below the bin.
Figure 3B:
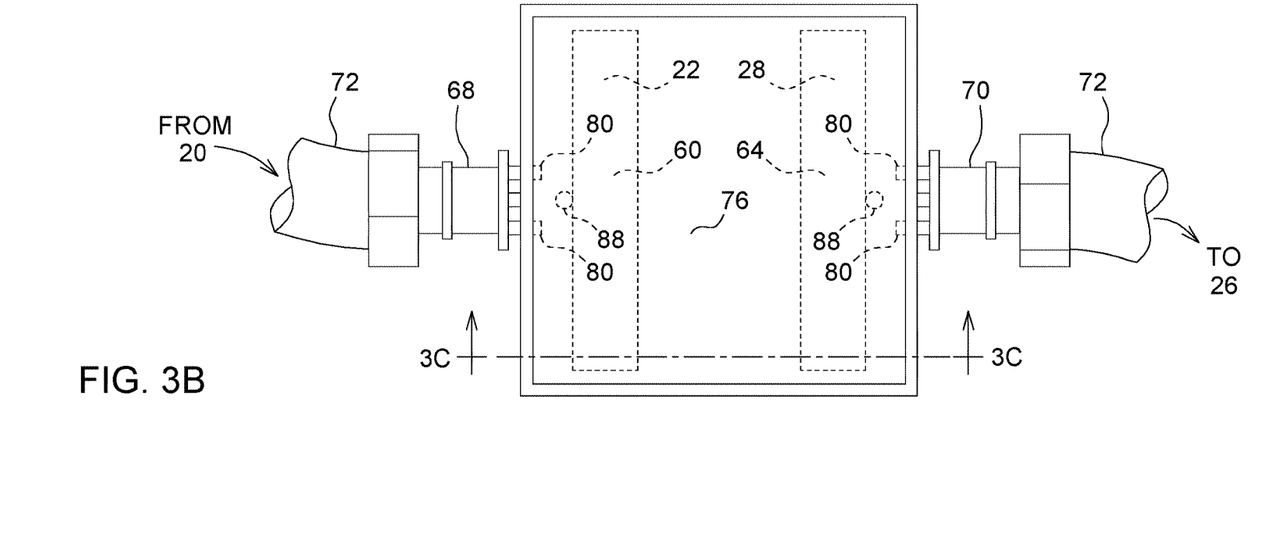
FIG. 3B is a plan view of the bin of FIG. 3A that illustrates a transmit antenna and a receive antenna (e.g., conductive traces), on an upper side of a substrate below the bin.
Figure 3C:
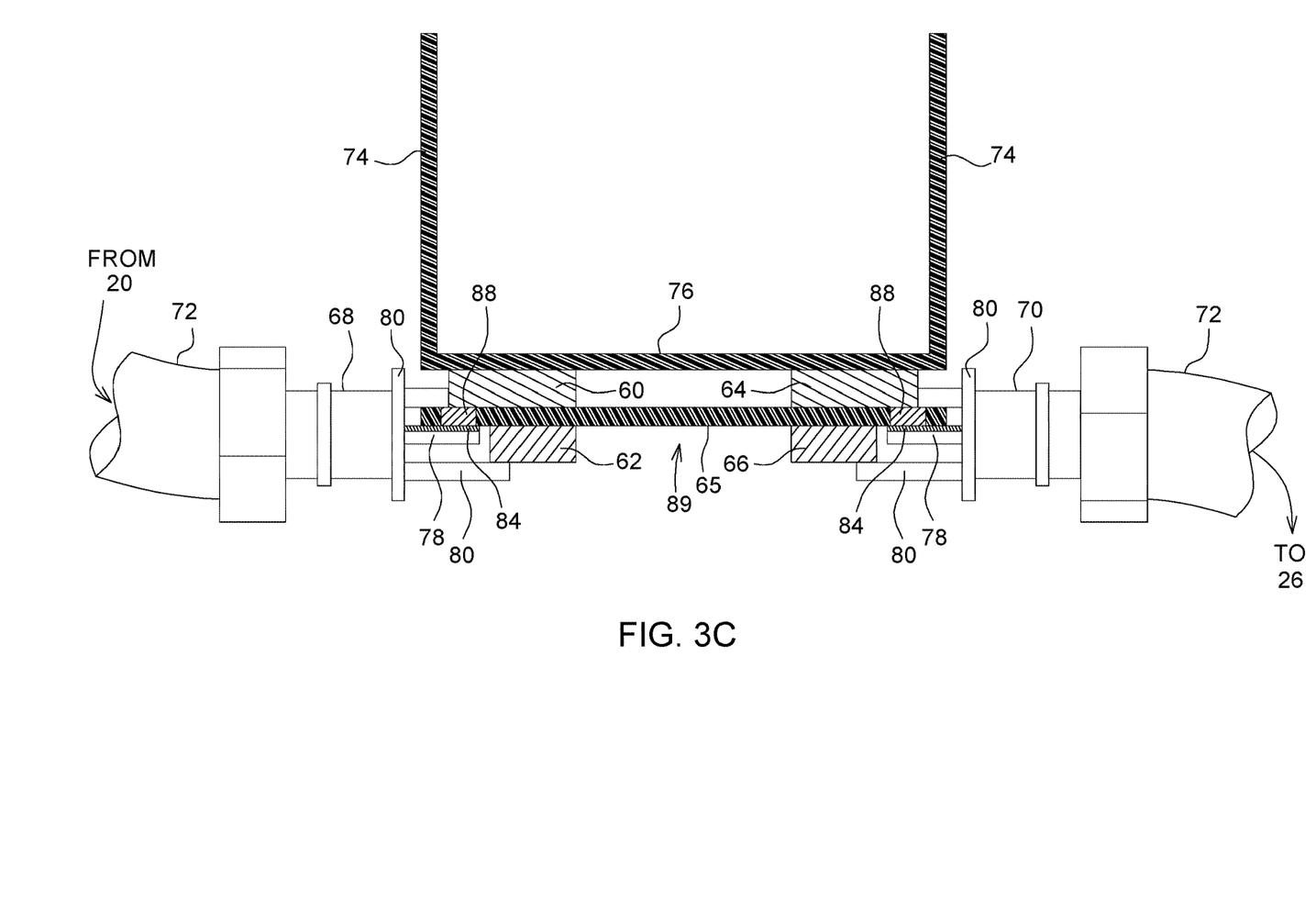
FIG. 3C is a cross sectional view of the bin taken along reference line 3C-3C of FIG.

FIG. 3A, FIG. 3B and FIG. 3C collectively illustrate a first embodiment and orientation of the transmit antenna 22 and receive antenna 28 associated with a bin 25, where the transmit antenna 22 and receive antenna 28 are associated with a bottom or bin bottom 76 of the bin 25. FIG. 3A is a plan view of one embodiment of a bin 25 with a grounded terminal of the transmission lines 72 connected to the respective conductive strips (62, 66), illustrated in dashed lines, on a lower side of a substrate below the bin bottom 76 of the bin 25. FIG. 3B is a plan view of the bin 25 of FIG. 3A that illustrates a transmit antenna 22 and a receive antenna 28, on an upper side of a substrate below the bin bottom 76 of the bin 25. FIG. 3C is a cross sectional view of the bin 25 taken along reference line 3C-3C of FIG. FIG. 3B.

In FIG. 3A through FIG. 3C, the transmit antenna 22 receives a signal from the transmitter 20 and the receive antenna 28 receives the transmitted signal to provide to the receiver 26. As illustrated, the transmit antenna 22 comprises a first conductive trace 60 that overlies a dielectric layer 65 and first conductive strip 62. The first conductive trace 60 is spaced apart from the first conductive strip 62 by the dielectric layer 65. As illustrated, the receive antenna 28 comprises a second conductive trace 64 that overlies a dielectric layer 65 and second conductive strip 66. The second conductive trace 64 is spaced apart from the second conductive strip 66 by the dielectric layer 65.

A circuit board comprises the transmit antenna 22 and the receive antenna 28 on the dielectric layer 65. A first connector 68 is mounted at or near an edge of a circuit board to receive a transmission line 72 or coaxial cable from the transmitter 20. A second connector 70 is mounted at or near an edge of a circuit board to provide a received signal to the receiver 26 via a transmission line 72 or coaxial cable. Although the first connector 68 and the second connector 70 are illustrated as edge-mount connectors, the first connector 68 and the second connector 70 may comprise a surface-mount connector, a through-hole mount connector, or an edge-mount connector. A center conductor 78 of the first connector 68 is electrically connected to, or coupled to, the first conductive trace 60, and the center conductor 78 of the second connector 70 is electrically connected to the second conductive trace 64. As illustrated, the center connector is coupled to the first conductive trace 60 via a conductive through-hole 88 or a conductive via in the circuit board and the center conductor 78 is coupled to the second conductive trace 64 via another conductive through hole or a conductive via in the circuit board. The first connector 68 has ground terminals 80 that are electrically connected (e.g. soldered) or coupled to the first conductive strip 62. The second connector 70 has ground terminals 80 that are electrically connected (e.g., soldered) or coupled to the second conductive strip 66.

In the illustrative embodiment of FIG. 3A, each center conductor 78 is electrically and mechanically connected to a corresponding conductive pad 84 by solder or a conductive adhesive, where the conductive pads 84, the first conductive strip 62 and the second conductive strip 66 are on a lower side of the circuit board and where the first conductive trace 60 and the second conductive trace 64 are on the upper side of the circuit board (e.g., facing an interior of the bin 25, but typically separated by the bin bottom 76 or a protective dielectric layer). Each conductive pad 84 is separated from the nearby first conductive strip 62 or second conductive strip 66 by a respective dielectric barrier region 86, an air gap, or both. The center conductor 78 is electrically separate from the ground terminal 80, which may be associated with an outer conductor of the transmission line 72.

In an alternate embodiment, the conductive through-hole 88 or conductive via may be eliminated, where the center conductor 78 is directly connected to the first conductive trace 60 or the second conductive trace 64 on a lower side of the circuit board.

Figure 4A:
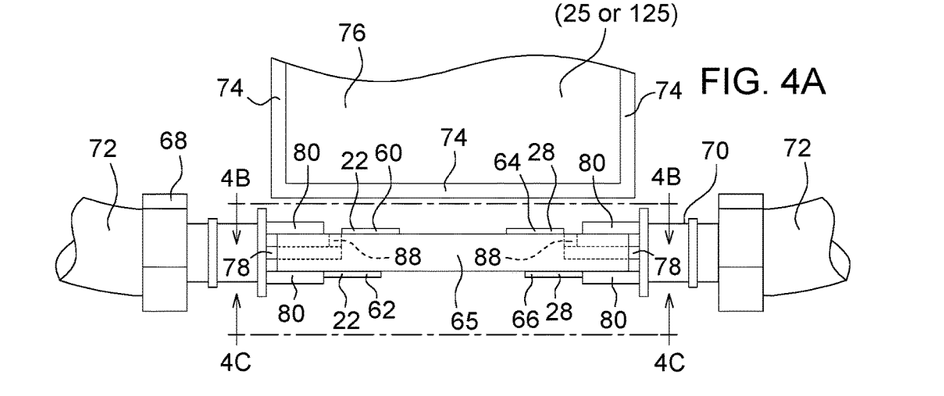
FIG. 4A is a plan view of another embodiment of a bin that illustrates transmit and receiver antennas on a circuit board on or near a side wall of the bin.
Figure 4B:
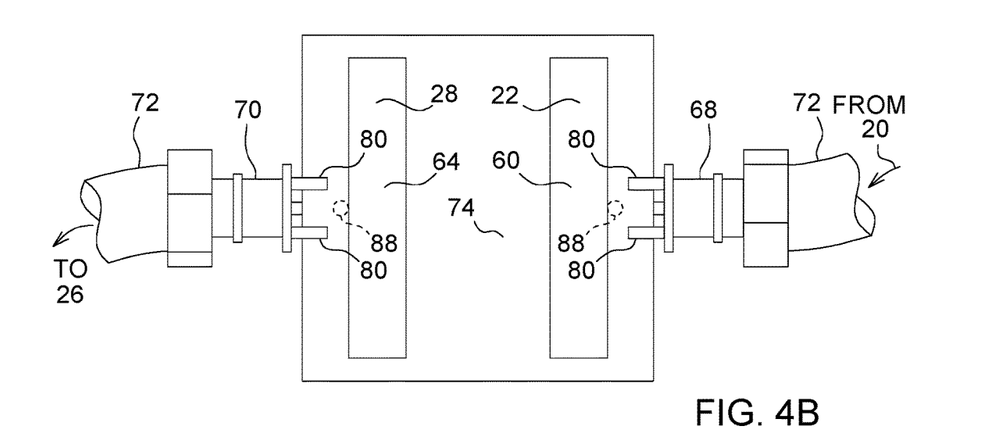
FIG. 4B is an elevation view of a bin and the circuit board of FIG. 4A as viewed along reference line 4B-4B.
Figure 4C:
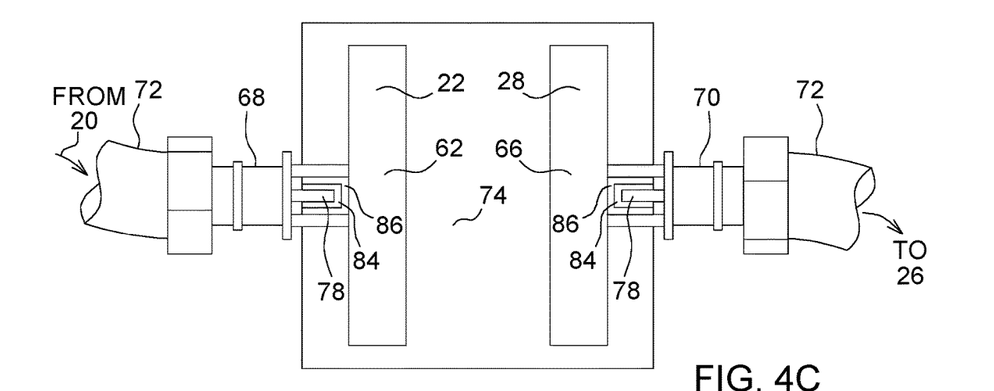
FIG. 4C is an elevation view of a bin and the circuit board of FIG. 4A as viewed along reference line 4C-4C.

FIG. 4A, FIG. 4B and FIG. 4C, collectively, illustrate a second embodiment and orientation of the transmit antenna 22 and receive antenna 28 associated with a bin 25, where the transmit antenna 22 and receive antenna 28 are associated with a side or side wall 74 of the bin 25. Although the transmit antenna 22 and receive antenna 28 are on a circuit board (or dielectric layer 65) on an outer side of a side wall 74 of a bin 25, in another embodiment the transmit antenna 22 and the receive antenna 28 may be embedded in the side wall 74, such as a dielectric side wall. Like reference numbers in FIG. 3A through FIG. 4C, inclusive, indicate like elements or features.

FIG. 4A is a plan view of the bin 25 that illustrates transmit antenna 22 that comprises a first conductive trace 60 spaced apart from a first conductive strip 62 by a dielectric layer 65. A connector 68 has ground terminals 80 connected to the first conductive strip 62 and a center conductor 78 connected to the first conductive trace 60 via a conductor associated with the dielectric layer 65. The connector 68 is associated with transmission line 72, such as coaxial cable, from the transmitter 20.

In FIG. 4A, the receive antenna 28 that comprises a second conductive trace 64 spaced apart from a second conductive strip 66 by a dielectric layer 65. A connector 68 has ground terminals 80 connected to the second conductive strip 66 and a center conductor 78 connected to the second conductive trace 64 via a conductor associated with the dielectric layer 65. The connector 68 is associated with transmission line 72, such as coaxial cable, to the receiver 26.

FIG. 4B is an elevation view of a bin and the circuit board of FIG. 4A as viewed along reference line 4B-4B. FIG. 4C is an elevation view of a bin and the circuit board of FIG. 4A as viewed along reference line 4C-4C. Like reference numbers in FIG. 4A through FIG. 4C indicate like elements or features.

As illustrated in FIG. 1 in conjunction with FIG. 3A through FIG. 4C, inclusive, the transmit antenna 22 comprises a conductive radiating element (e.g. metallic patch antenna element) on a dielectric substrate or a microstrip antenna. For example, the first conductive trace 60 comprises a conductive radiating element that is separated from a ground plane, transmit strip or first conductive strip 62 by a dielectric layer (e.g., 65). The radiating element and transmit strip, or the radiating element and the ground plane, may be composed of a metal layer or metallic layer, such as copper or a copper alloy. The transmitter 20 provides the transmitted signal or electromagnetic signal (e.g., between 100 MHz and 6 GHz) to the transmit antenna 22 via a strip line, microstrip, coaxial cable, or other transmission line 72. The transmit antenna 22 has a transmission line 72 that is electrically connected to or electromagnetically coupled to the radiating element.

As illustrated in FIG. 1 in conjunction with FIG. 3B through FIG. 4C, inclusive, a receive antenna 28 comprises a receiving element (e.g., metallic patch antenna element) on a dielectric substrate or a microstrip antenna. For example, the second conductive trace comprises 64 a receiving element that is separated from a second ground plane, a receive strip, or second conductive strip 66 by a dielectric layer (e.g., 65). The receiving element, the receive strip, or the receiving element and the ground plane may be composed of a metal layer or metallic layer, such as copper or a copper alloy. The receive antenna 28 is arranged to receive the transmitted signal.

The level sensor can use the fringing field electromagnetic technology to measure level of seeds 24 in a bin 25 (e.g., hopper). As illustrated in FIG. 4A, FIG. 4B, and FIG. 4C, collectively, each transmit antenna 22 and each receive antenna 28 are placed vertically on an outside side wall of the bin, such as the bin 25, the first bin 125, the second bin 225, or any combination of the foregoing bins. The transmit antenna 22 can be tuned to a particular frequency range. For example, the transmit antenna 22 could be from one to eight inches long. Two parallel metal strips of the antennas (22, 28) are separated by a gap and serve as transmit and receive antennas. A transmitted signal at a primary frequency, such as 3 Gigahertz (GHz) or within an ultra-high frequency (UHF) range or microwave frequency range, is applied to the transmit antenna 22 and coupled to the receive antenna 28.

In FIG. 3A through FIG. 4C, inclusive, part of the electromagnetic field surrounding the antennas (22, 28) penetrates through the bottom or side wall of the bin 25 (e.g., hopper) and occupies a part of the internal volume of the bin 25 (e.g., hopper). Phase shift between the transmitted and received signals is affected by dielectric constant of the media or space between the transmit and receive antennas (22, 28). For example, in an empty hopper, the relative dielectric constant is one (1) and dry seeds 24 have the constant of approximately two point five (2.5). The data processor 44 or data processing system 38 can estimate the level of seeds 24 in the hopper from the measured phase of the received signal.

Figure 5:
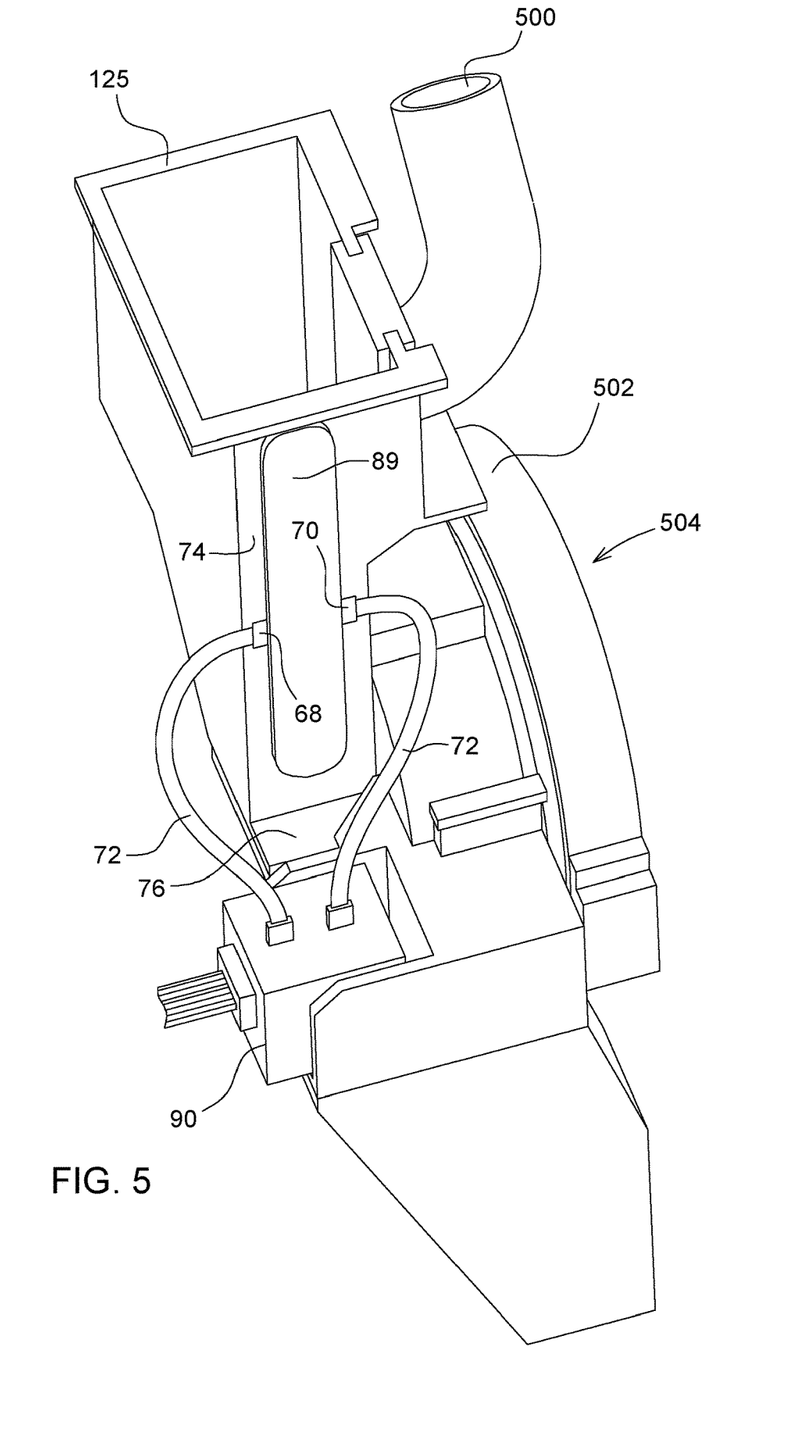
FIG. 5 is a perspective view of a bin or hopper associated with a planter that can incorporate the transmit and receive antenna of FIG. 3C or FIG. 4A.

As illustrated in FIG. 5, the transmit antenna 22 is mounted on a row unit 504 of a planter or planting implement and the receive antenna 28 is mounted on the row unit 504 for receiving the signal from the transmit antenna 22. The planter or planting implement may have one or more row units 504, where each row unit 504 may be associated with a different transmitter 20, transmit antenna 22, receive antenna 28 and receiver 26 that feed a data processing system 38. The circuit board or antenna assembly 89 comprises the transmit antenna 22 and the receive antenna 28.

Each row unit 504 has a corresponding bin, such as a first bin 125 or second bin 225. A bin wall (e.g., 74) or first bin 125 may be composed of a dielectric material, such as plastic, a polymer, a composite, a fiber reinforced polymer, a fiber reinforced plastic, or a filler in a resin matrix or binder. The first bin 125 receives seed or other plant material for planting via a seed input tube 500. The vacuum meter 502 takes seeds from the first bin 125 and provides seeds to the seed disk with recesses for accepting the seeds and placing or inserting the seeds into the ground or soil. A row unit electronics module 90 comprises one or more of the following: the transmitter 20, the receiver 26, and the data processing system 38.

As illustrated, FIG. 5 may incorporate the embodiment of transmit antenna 22 and receive antenna 28 (collectively antenna assembly 89) of FIG. 4A and FIG. 4B with respect to the first bin 125. Accordingly, the antenna assembly 89 is disposed on a substrate or circuit board positioned adjacent to or integral with any bin wall 74 or side wall of a bin (25, 125, 225). For example, the transmit antenna 22 and the receive antenna 28 are secured to or embedded in a dielectric wall of the bin 125.

In an alternate embodiment, FIG. 5 may incorporate the first embodiment of transmit antenna 22 and receive antenna 28 of FIG. 3A through FIG. 3C with respect to the bin 125. Accordingly, in the alternate embodiment, the transmit antenna 22 and the receive antenna 28 are disposed on or integral with a substrate or circuit board positioned beneath a bin bottom 76. For instance, transmit antenna 22 and the receive antenna 28 are secured to or embedded in a dielectric bottom of the bin 125.

Figure 6:
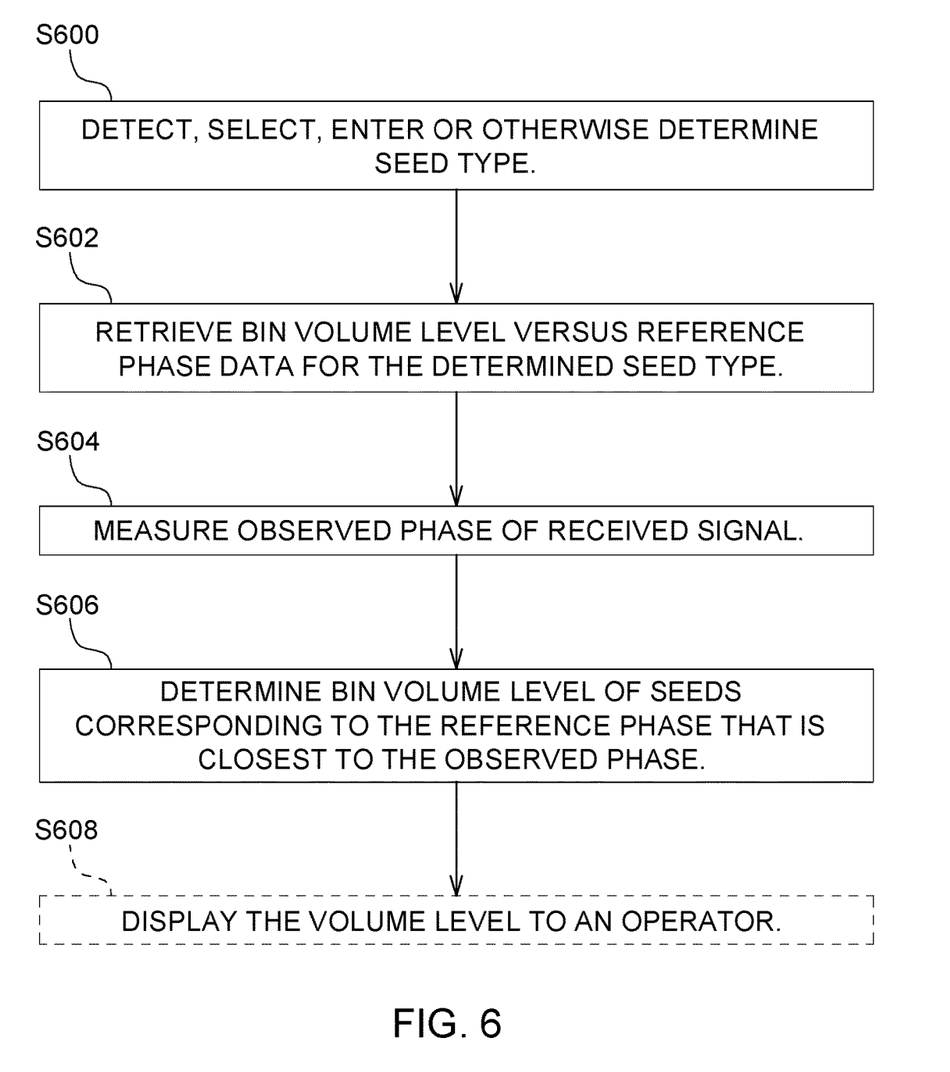
FIG. 6 is a flow chart of one embodiment of a method for measuring one or more seed levels in a bin.

FIG. 6 is a flow chart of one embodiment of a method for measuring one or more seed levels in a bin 25. The method of FIG. 6 begins in step S600.

In step S600, a seed type is determined for the seed or plant material in a respective bin (25, 125, 225). For example, the data processor 44 detects or supports the user's entry or selection of a seed type that is held in the bin 25, or, more particularly, held in the bin 25 of a planter. The method of step S600 may be carried out by various techniques, which are applied separately or cumulatively. Under a first technique, a user or operator may enter a seed type into or via a user interface 54. The seed type may relate to the species, variety, hybrid, seed identifier, seed coating, seed chemical treatment, seed inoculation, or other seed description. For instance, the seed type may represent the selection of maize, corn, wheat, oats, beans, soybean, canola, oilseeds 24, fiber, or other plant material.

Under a second technique, a measurement device (111, 211) or phase measurement module 34 may measure an observed phase change (e.g., secondary phase change) or attenuation of a signal (e.g., secondary signal) transmitted from the transmit antenna 22 to the receive antenna 28 when a seed at a known level (e.g., full level) is present in the bin 25 to determine the seed type in the bin 25; the observed phase change is compared to match it against a reference phase change of a known seed type or plant material to identify the seed type, where the reference phase change is stored in the data storage device 46.

Under a third technique for executing step S600, first, the measurement unit 31 measures a sensed phase of a secondary received signal when seeds 24 are in the bin (25, 125, 225) at a known bin level (e.g., full level or another reference level); second, the data processor 44 retrieves or accesses a reference phase of a secondary received signal when the bin 25 is or approaches empty (e.g., at a reference level that is less full than the full level); third, the data processor 44 determines a secondary phase difference between the sensed phase and the reference phase of the secondary received signal; fourth, the data processor 44 identifies a seed type based on the secondary determined difference from previously stored reference data in the data storage device 46, where the observed secondary phase difference is equal to or within a maximum range or maximum tolerance of the reference data. For example, in one embodiment the maximum tolerance may equal to or less than (plus or minus) five percent. In one embodiment, the secondary received signal has a frequency within a range of approximately 240 MHz to approximately 3 GHz.

In step S602, the data processor 44 retrieves or accesses data from the data storage device 46, where the data relates to a reference bin 25 level (e.g., bin 25 volume level) versus reference phase for the determined seed type. Once the seed type is identified, the data processor 44 may search or access reference measurement data or reference phase data 50 (e.g., reference phase data measurement data) that reflects a seed-type specific relationship data for phase (e.g., primary phase difference or secondary phase difference) versus bin level. In one embodiment, the data related to the reference bin level versus reference phase, or the seed-type specific relationship, can be expressed as a chart, a linear equation or a quadratic equation.

In step S604, the measurement unit 31 measures an observed phase or observed phase shift of a primary received signal that is transmitted from the transmit antenna 22 to the receive antenna 28. Step S604 may be carried out by various techniques, which may be applied alternately or cumulatively.

Under a first technique, first, the measuring device (111 or 211) or the phase measurement module 34 measures a detected phase (e.g., observed primary phase) of a primary received signal where seeds 24 are in the bin 25 or expected to be in the bin; second, the data processor 44 retrieves or accesses a reference phase (e.g., reference primary phase) of a primary received signal where the bin 25 is empty; and, third, the data processor 44 or estimator 48 determines the observed phase as a primary phase difference between the detected phase and the reference phase of the primary received signal.

Under a second technique, the primary frequency is within a frequency range of approximately 800 Megahertz (MHz) to approximately 3 Gigahertz (GHz).

Under a third technique, a transmitter 20 transmits the primary frequency via a transmit antenna 22 that is separated from a receive antenna 28 by a known spacing on a substantially co-planar dielectric substrate, where the receive antenna 28 and the transmit antenna 22 are arranged in a substantially vertical plane of the bin (25, 125, 225, e.g., in a bin wall 74 such as that illustrated in FIG. 5) for carrying seeds 24 of a planter.

Under a fourth technique, a transmitter 20 transmits the primary frequency via a transmit antenna 22 that is separated from a receive antenna 28 by a known spacing on a substantially co-planar dielectric substrate (e.g., dielectric layer 65), where the receive antenna 28 and transmit antenna 22 are arranged in a substantially horizontal plane of the bin 125 (e.g., in a bin bottom 76) for carrying seeds 24 of a planter. In practice, the antennas can be in microstrip configuration with ground plane and the antenna on the dielectric substrate can be covered with dielectric spacer or layer to protect the antenna from shorting out to ground or other components.

In step S606, the data processor 44 or estimator 48 determines an estimated bin level (e.g., bin volume level) of seeds 24 in the bin (25, 125, 225), where the estimated bin level is established as the reference bin level that corresponds to the respective reference phase (e.g., reference primary phase) that is matched to or closest in value to the observed phase (e.g. observed primary phase). During operation of the equipment or planter, a bin level can be estimated from a seed-type specific relationship between the primary phase difference and a reference bin level. For example, the seed-type specific relationship can be expressed as a look-up table, a chart, a linear equation, a set of linear equations, or a quadratic equation, among other things.

In step S608, the data processing system 38 or its display 56 displays the estimated bin level to an operator or controls the replenishment or refilling of seeds 24 in the bin to maintain a target bin level. Step S608 may be carried out in accordance with various procedures that may be executed separately or distinctly. Under a first procedure, the data processing system 38 or the display 56 is adapted to display 56 the estimated bin 25 level, which is indicative of a volume, weight or level of seeds 24 in the bin 25 as a bin level. Under a second procedure, the bin level relates to one hopper for a row of a planter or planting device. Under a third procedure, the data processing system 38 or its display 56 displays the estimated bin level as a fraction of total bin volume capacity, fraction of total bin weight capacity, a percent of bin volume capacity, or a percent of bin weight capacity of one or more bins (e.g., 25, 125, 225).

Step S608 is indicated in dashed lines because it is optional. In an alternate embodiment, the data processing system 38 or data processor 44 may generate a data message, status message or a signal indicating a particular bin level (e.g., of a corresponding row unit or row unit identifier) to a central controller that allocates seeds to one or more bins from a central storage container that stores seeds. For example, the central controller provides (e.g. allocates) seeds or a refill seed quantity to one or more bins by pneumatic-feed arrangement or a gravity-feed arrangement when a data message, status message, or signal indicates that the particular bin level is below a threshold target bin level.

Figure 7:
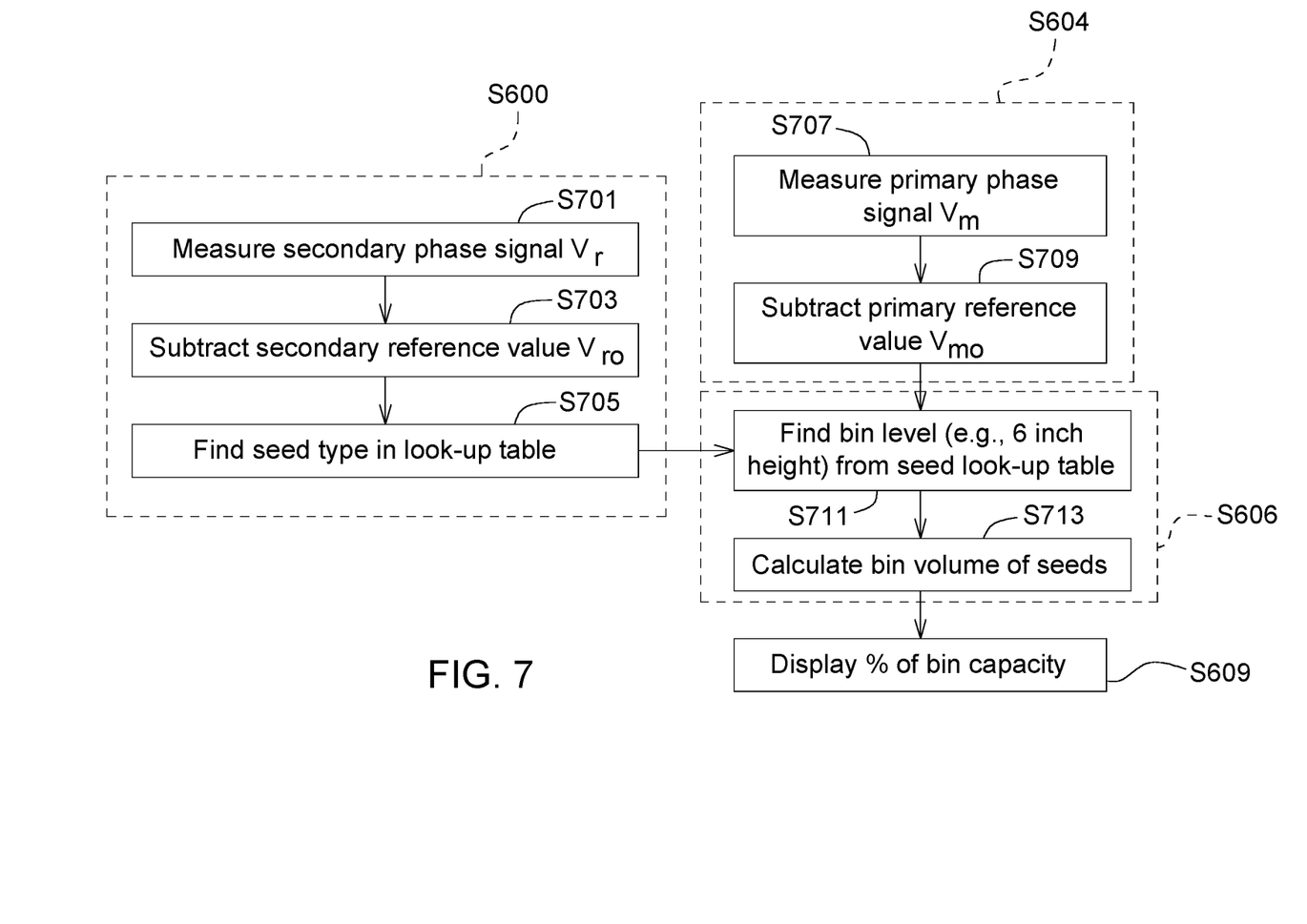
FIG. 7 is a flow chart of another embodiment of a method for measuring one or more seed levels in a bin.

FIG. 7 is a flow chart of another embodiment of a method for measuring one or more seed levels in a bin 25. FIG. 7 illustrates certain steps of FIG. 6 in greater detail. Like reference numbers in FIG. 6 and FIG. 7 indicate like elements, steps, procedures or features. The first bin 125, the second bin 225, or both may be substituted for the bin 25 referenced in the method of FIG. 7.

Step S600 is optional and may be deleted where the seed type is known, scanned or otherwise entered into a user interface 54 by an operator. As illustrated, step S600 may be carried out by steps S701, S703 and S705. In step S701, the measurement unit 31 or phase measurement module 34 measures a sensed phase (e.g., observed secondary phase) of a secondary received signal ($V_r$) when seeds 24 are in the bin 25. In step S703, the data processor 44 retrieves or accesses, from the data storage device 46, a reference secondary phase of a secondary received signal ($V_{ro}$) when the bin 25 is empty.

In an alternate embodiment, step S703 may require a calibration process in which the measurement unit 31 or phase measurement module 34 measures a reference secondary phase of the secondary received signal ($V_{ro}$) when the bin 25 is empty. For instance, the measurement of the reference secondary phase can replace the retrieval or access, from the data storage device 46, of the reference secondary phase.

In step S705, the data processor 44 determines a secondary phase difference between the sensed secondary phase and the reference secondary phase of the secondary received signal; the data processor 44 can identify a seed type based on the secondary determined difference from a look-up table or other data structure (e.g., stored in the data storage device 46). In one embodiment, the seed type is displayed on a user interface 54 or display 56 to an operator. In another embodiment, a seed type identifier is stored or flagged in the data storage device 46, or an associated look-up table for the particular seed-type is flagged for use in step S606.

Step S604 may be carried out by step S707 and S709. In step S707, the measurement unit 31 or phase measurement module 34 measures the primary phase of the primary received signal ($V_m$) when seed or plant material is in the bin 25. Further, the measurement unit 31 or phase measurement module 34 may measure the primary reference phase ($V_{mo}$) when seed or plant material is not in the bin 25, or when the bin 25 is empty prior to loading the seed or plant material into the bin 25.

In step S709, the data processor 44 subtracts the primary reference phase ($V_{mo}$) from the observed primary phase of the primary signal ($V_m$) to determine a primary phase difference. For example, the primary phase difference accounts for or cancels out sources of error in the phase measurements, such as: (1) the phase shift that is attributable to the spacing and orientation between the transmit antenna 22 and receive antenna 28, and (2) the phase shift from the bin 25, such as the phase shift owing to the bin material (e.g., dielectric material) and geometric configuration of the bin 25. Accordingly, the primary phase difference provides an accurate measurement of the phase shift that is attributable to one or more of the following: (a) the type of seed in the bin 25, (b) the moisture content of the seed 24 in the bin, (c) the oil content of the seed 24 in the bin, and (d) the level of seed in the bin 25.

Step S606 may be carried out by step S711 and step S713. In step S711, the data processor 44 finds a bin level from a look-up table, chart, linear equation, piecewise linear function (e.g., see FIG. 8), quadratic equation, or other data structure stored in the data storage device 46. In one embodiment, the look-table or data structure comprises a set of primary phase differences and corresponding bin levels, expressed as bin level (e.g., bin level height), bin level volume, bin level mass, percentage of bin level capacity and percentage of bin level volume.

In one embodiment, the secondary phase difference is used to select a particular look-up table or other data structure for a particular seed type from a set of candidate look-up tables of different seed types. In practice, the look-up tables may differ for different seed types because of the density, moisture content, oil content, of the different seed types, or other factors.

In one configuration, in step S711 the data processor 44 is adapted to or programmed to retrieve or access (e.g., in the data storage device 46) a reference bin level versus reference phase (e.g., reference primary phase difference) for the determined seed type. Each reference phase level (or reference phase level difference) is associated with a corresponding reference bin level. Given the observed primary phase or primary phase difference, the estimator 48 or data processor 44 is adapted to determine an estimated bin level of seeds, where the estimated bin level is established as the reference bin level that corresponds to the respective reference phase that is closest in value to the observed phase, the observed primary phase, or the primary phase difference.

In step S713, the data processor 44 estimates the bin level (e.g., level, height, volume or mass (weight)) of the seeds 24 in the bin 25 or the data processor 44 estimates the percentage or volume of full capacity of the bin 25.

In step S609, the data processor 44 or display 56 displays the bin level or volume level, such as the percentage or volume of fully capacity or bin 25 capacity to an operator. Step S609 is similar to step S608 of FIG. 6 and represents an illustrative example of how step S608 can be carried out in step S609.

FIG. 8 is an illustrative chart of bin level versus phase shift (or change in phase of a received signal) for two different seed types at an illustrative constant test frequency (e.g., 1 to 3 Gigahertz (GHz)). In FIG. 8, the vertical axis 800 illustrates the phase shift (e.g., in degrees), whereas the horizontal axis 802 illustrates the bin level (e.g., in inches).

The rectangular points or solid line 804 indicate the bin level of a bin (25, 125, 225) for a corresponding phase shift or primary phase shift for a first particular seed type, such as wheat. The solid line 804 for the first particular seed type can be stored as a first data structure, such as a first look-up table, a first set of piecewise linear functions or line equations, a first quadratic equation, a chart, or in another suitable data structure.

The diamond points or dashed line 806 indicate the bin level (25, 125, 225) for a corresponding phase shift for a second particular seed type, such as canola. The dashed line 806 for the second particular seed type can be stored as a second data structure, such as a second look-up table, a second set of piecewise linear functions or line equations, a second quadratic equation, or in another data structure.

As previously indicated, the data processor 44 can use the secondary difference to determine whether to use the first data structure (for the first particular seed type) or the second data structure (for the second particular seed type).

Having described one or more embodiments in this disclosure, it will become apparent that various modifications can be made without departing from the scope of the invention as defined in the accompanying claims. For example, one or more of any dependent claims set forth in this document may be combined with any independent claim to form any combination of features set forth in the appended claims, and such combination of features in the claims are hereby incorporated by reference into the specification of this document.

We claim:

1. A method for measuring one or more seed levels in a bin, the method comprising:
   determining a seed type;
   retrieving or accessing a reference bin level versus reference phase for the determined seed type,
   measuring an observed phase of a primary received signal;
   determining an estimated bin level of seeds, where the estimated bin level is established as the reference bin level that corresponds to the respective reference phase that is closest in value to the observed phase; and
   displaying the estimated bin level to an operator.

2. The method according to claim 1, wherein the bin level relates to one hopper for a row of a planter or planting device.

3. The method according to claim 1 wherein the measuring of the observed phase further comprises:

measuring a detected phase of a primary received signal where seeds are in the bin;

retrieving or accessing a reference phase of a primary received signal where the bin is empty; and determining the observed phase as a primary phase difference between the detected phase and the reference phase of the primary received signal.

4. The method according to claim 1 wherein the determining of the seed type comprises:

measuring a sensed phase of a secondary received signal when seeds are in the bin;

retrieving or accessing a reference phase of a secondary received signal when the bin is empty; and determining a secondary phase difference between the sensed phase and the reference phase of the secondary received signal;

identifying a seed type based on the secondary determined difference.

5. The method according claim 4 wherein the secondary received signal has a frequency within a range of approximately 240 MHz to approximately 3 GHz.

6. The method according to claim 1 wherein the determining of the estimated bin level further comprises:

estimating the estimated bin level from a seed-type specific relationship between the primary phase difference and a reference bin level.

7. The method according to claim 6 wherein the seed-type specific relationship can be expressed as a chart, a linear equation or a quadratic equation.

8. The method according to claim 1 wherein the displaying of the estimated bin level is indicative of a volume of seeds in the bin and wherein the estimated bin level is displayed as a fraction of total bin volume capacity, fraction of total bin weight capacity, a percent of bin volume capacity, or a percent of bin weight capacity.

9. The method according to claim 1 wherein the primary frequency is within a frequency range of approximately 800 Megahertz (MHz) to approximately 3 Gigahertz (GHz).

10. The method according to claim 1 wherein the primary frequency is transmitted via a transmit antenna that is separated from a receive antenna by a known spacing on a substantially co-planar dielectric substrate.

11. The method according to claim 10 wherein the receive antenna and the transmit antenna are arranged in a vertical plane of the bin for carrying seeds of a planter.

12. The method according to claim 10 wherein the receive antenna and transmitted antenna are arranged in a horizontal plane of the bin for carrying seeds of a planter.

13. A system for measuring one or more seed levels in a bin, the system comprising:

a data storage device for storing a determined seed type in a bin;

a data processor for retrieving from or accessing the data storage device a reference bin level versus reference phase for the determined seed type;

a measurement unit for measuring an observed phase of a primary received signal;

an estimator or data processor for determining an estimated bin level of seeds, where the estimated bin level is established as the reference bin level that corresponds to the respective reference phase that is closest in value to the observed phase; and a display for displaying the estimated bin level to an operator.

14. The system according to claim 13 further comprising:

an input device for inputting or determining a seed type in a bin, wherein the user interface comprises a bar code scanner, a optical scanner, or an imaging device, that a supports scanning or imaging a seed label indicative of seed type.

15. The system according to claim 13 further comprising:

the data storage device adapted to store reference measurements of a reference attenuation, and reference phase shift, or both for a corresponding seed of known seed type in the bin at one or more known levels.

16. The system according to claim 13 wherein the bin level relates to one hopper for a row of a planter or planting device.

17. The system according to claim 13 wherein the measurement device is adapted to:

measure a detected phase of a primary received signal where seeds are in the bin;

retrieve or access a reference phase of a primary received signal where the bin is empty; and determine the observed phase as a primary phase difference between the detected phase and the reference phase of the primary received signal.

18. The system according to claim 13 wherein the data processor is adapted to:

measure a sensed phase of a secondary received signal when seeds are in the bin at a reference level;

retrieve or access a reference phase of a secondary received signal when the bin is empty or filled to the reference level with a known seed type; and determine a secondary phase difference between the sensed phase and the reference phase of the secondary received signal;

identify a seed type based on the secondary determined difference.

19. The system according claim 18 wherein the secondary received signal has a frequency within a range of approximately 240 MHz to approximately 3 GHz.

20. The system according to claim 13 wherein the estimator or the data processor is adapted to estimate the estimated bin level from a seed-type specific relationship between the primary phase difference and a reference bin level.

21. The system according to claim 20 wherein the seed-type specific relationship can be expressed as a chart, a linear equation or a quadratic equation.

22. The system according to claim 13 wherein the primary frequency is within a frequency range of approximately 800 Megahertz (MHz) to approximately 3 Gigahertz (GHz).

23. The system according to claim 13 wherein the primary frequency is transmitted via a transmit antenna that is separated from a receive antenna by a known spacing on a substantially co-planar dielectric substrate.

24. The system according to claim 23 wherein the receive antenna and the transmit antenna are arranged in a vertical plane of the bin for carrying seeds of a planter.

25. The system according to claim 24 wherein the transmit antenna and the receive antenna are secured to or embedded in a dielectric wall of the bin.

26. The system according to claim 23 wherein the receive antenna and transmitted antenna are arranged in a horizontal plane of the bin for carrying seeds of a planter.

27. The system according to claim 26 wherein the transmit antenna and the receive antenna are secured to or embedded in a dielectric bottom of the bin.

\* \* \* \* \*